United States Patent
Backfolk et al.

(10) Patent No.: US 12,258,715 B2
(45) Date of Patent: Mar. 25, 2025

(54) METHOD FOR APPLYING STARCH TO A PAPER OR PAPERBOARD WEB

(71) Applicant: Stora Enso OYJ, Helsinki (FI)

(72) Inventors: Kaj Backfolk, Villmanstrand (FI); Isto Heiskanen, Imatra (FI); Johanna Lyytikainen, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 496 days.

(21) Appl. No.: 17/610,860

(22) PCT Filed: May 13, 2020

(86) PCT No.: PCT/IB2020/054505
§ 371 (c)(1),
(2) Date: Nov. 12, 2021

(87) PCT Pub. No.: WO2020/230035
PCT Pub. Date: Nov. 19, 2020

(65) Prior Publication Data
US 2022/0243401 A1    Aug. 4, 2022

(30) Foreign Application Priority Data

May 14, 2019 (SE) .................... 1950568-4

(51) Int. Cl.
*D21H 19/12* (2006.01)
*D21H 23/48* (2006.01)
*D21H 23/50* (2006.01)
*D21J 1/08* (2006.01)

(52) U.S. Cl.
CPC ............. *D21H 19/12* (2013.01); *D21H 23/48* (2013.01); *D21H 23/50* (2013.01); *D21J 1/08* (2013.01)

(58) Field of Classification Search
CPC ........ D21H 21/56; D21H 19/00; D21H 19/10; D21H 19/12; D21H 19/14; D21H 19/34; D21H 19/52; D21H 19/54; D21H 17/28; D21H 11/18; D21F 11/002
See application file for complete search history.

(56) References Cited

U.S. PATENT DOCUMENTS

| | | | |
|---|---|---|---|
| 3,210,240 A * | 10/1965 | Read | D21H 21/56 127/71 |
| 4,184,914 A | 1/1980 | Jenkins | |
| 4,279,964 A | 7/1981 | Heller | |
| 6,648,955 B1 | 11/2003 | Swiezkowski et al. | |
| 2011/0300394 A1 | 12/2011 | Welsch et al. | |
| 2012/0164200 A1 | 6/2012 | Qin et al. | |
| 2013/0157012 A1 | 6/2013 | Qin et al. | |
| 2015/0096700 A1 | 4/2015 | Heiskanen et al. | |
| 2018/0245289 A1 | 8/2018 | Heiskanen et al. | |
| 2018/0355557 A1 * | 12/2018 | Heiskanen | D21H 17/28 |
| 2019/0010302 A1 | 1/2019 | Wastyn et al. | |

FOREIGN PATENT DOCUMENTS

| | | | |
|---|---|---|---|
| CN | 102733267 A | 10/2012 | |
| CN | 104285006 A | 1/2015 | |
| EP | 0195458 A1 | 9/1986 | |
| EP | 2744728 A1 | 6/2014 | |
| EP | 3178852 A1 | 6/2017 | |
| JP | 2009228173 A | 10/2009 | |
| JP | 2009293138 A | 12/2009 | |
| WO | 0200804 A2 | 1/2002 | |
| WO | 2012047162 A1 | 4/2012 | |
| WO | 2013027103 A1 | 2/2013 | |
| WO | WO 2013/160564 * | 10/2013 | D21H 21/24 |
| WO | 2016079700 A1 | 5/2016 | |
| WO | 2016207783 A1 | 12/2016 | |
| WO | 2017098046 A1 | 6/2017 | |
| WO | 2018011667 A1 | 1/2018 | |

OTHER PUBLICATIONS

Eklund, R.W. et al., Foamcote: high-speed application of foamed starch to a paper web, Tappl Journal, May 1986, pp. 70-74.
International Search report from corresponding PCT application No. PCT/IB2020/054505 mailed Jun. 18, 2020.
Extended European Search Report from corresponding European patent application No. 20806387.5 mailed May 5, 2023.

* cited by examiner

*Primary Examiner* — Dennis R Cordray
(74) *Attorney, Agent, or Firm* — Greer, Burns & Crain, Ltd.

(57) ABSTRACT

The invention relates to a method for applying starch to a paper or paperboard web, the method comprising the steps of: providing an aqueous suspension comprising starch particles and at least 1 wt %, based on the dry solid content of the suspension, of an amphiphilic polymer, creating a foam of the aqueous suspension, and applying the foam to the paper or paperboard web. The invention further relates to a paper or paper board product obtained by the method.

15 Claims, No Drawings

METHOD FOR APPLYING STARCH TO A PAPER OR PAPERBOARD WEB

This application is a U.S. National Phase under 35 U.S.C. § 371 of International Application No. PCT/IB2020/054505, filed May 13, 2020, which claims priority under 35 U.S.C. §§ 119 and 365 to Swedish Application No. 1950568-4, filed May 14, 2019.

The present invention relates to the manufacture of paper or paperboard, and particularly relates to the application of starch to a paper or paperboard web.

Starch is an important nonfibrous material used in papermaking processes. Starches are applied during the industrial papermaking process at several steps by several different methods to achieve the desired results. For example, starch can be added to the pulp before sheet formation, it can be sprayed in between the layers of multi layered paperboard, and it can be applied onto the paper surface for surface sizing. The raw material for starches includes plants, such as corn, wheat, barley, potato, tapioca, etc., the tubers, seeds, etc. thereof being sources of starch.

For use as an adhesive between plies in the production of a multiply paperboard, such as cup stock, starch is used in form of starch particles, i.e. starch in the form of uncooked starch, at the wet-end. Starch can be added onto the surface at the wet end or latest before putting the plies together. The use of unccoked starch in the wet-end in between plies in multiply paperboard has been found to be effective in increasing ply bond strength. Uncooked starch in the form of starch particles however only is applied onto the wet paper or paperboard web prior to the drying section where the starch then is cooked. Starch dosing between plies is commonly done with spray or curtain coating of liquid solutions. Both methods, spray and curtain, are dependent on the rheological properties, solid content and formulation of the liquid. Spray application usually is performed using low viscosity liquids and results in a low solid content. Further, spray application is causing a lot of dust and therefore contaminants and deposits and causes microbial growth in the paperboard environment. Dosing of dilute solutions to a paper or paperboard web is not cost efficient and might lead to uneven distribution and unnecessary wetting.

Starch is also used for the sizing of paper or paperboard. Many paper processes utilize a surface treatment known as sizing. Typically this is accomplished by applying a thin layer of starch after the drying of the paper in a section of the paper machine known as the size press. A major portion of the total starch is applied by the size presses on the surface of the paper. The surface size treatment fills the voids in the paper sheet and so improves surface integrity and printability, but also surface strength. Sizing of paper or paperboard at the dry-end utilizes the application of cooked starch. Starch is often added in cooked form onto a dried paper.

Foam coating has been proposed to reduce problems caused by large amount of liquid medium used in conventional surface treatments. In foam coating, foam is used as a carrier phase for the applied chemicals or agents. The foam is mechanically broken down after application to the paper or paperboard surface. EP 2 744 728 B1, for example, discloses a process to apply a barrier coating onto a paperboard, wherein the coating mixture preferably is applied by foam coating. The barrier may be combined with another barrier structure based on bio barrier such as starch or polysaccharide based barriers. However, the teaching does not hint at applying starch via foam coating methods. WO 2016/207783 A1 discloses a method to manufacture a film of a nanofibrillated polysaccharide by use of foam forming, including an amphiphilic polymer. However, the teaching refers to the wet-end process of manufacturing a paper web and does not relate to foam coating methods or to applying starch particles. WO 2018/011667 A1 discloses a process for creating a foam and using the foam in a foam coating process for manufacturing a paper or board product. An antimicrobial starch is used in the coating. The teaching however does not refer to uncooked starch particles.

Thus, there remains a need for a method that is suitable for wet on wet dosing or dosing to wet web and enables application of a higher solid content.

This object is met with the method and the paper or paper board product according to the independent claims of the present invention. The dependent claims are related to preferred embodiments. They may be combined freely unless the context clearly indicates otherwise.

The invention provides a method for applying starch to a paper or paperboard web, the method comprising the steps of:
  providing an aqueous suspension comprising starch particles and at least 1 wt %, based on the dry solid content of the suspension, of an amphiphilic polymer,
  creating a foam of the aqueous suspension, and
  applying the foam to the paper or paperboard web.

The aqueous suspension for foam forming comprises particles of starch and an amphiphilic polymer. It has surprisingly been found that it is possible to use foam coating techniques for the application of starch particles, i.e. particles of uncooked or partly uncooked starch, to a paper or paperboard web, if the foam composition further comprises an amphiphilic polymer.

Without being bound to a specific theory, it is assumed that the amphiphilic polymer provides for the possibility to use foam coating of starch particles at high solid contents. The foam created from suspensions of particulate uncooked starch using amphiphilic polymer unexpectedly provided a much higher solid content of starch compared to the use of a surface active agent such as sodium dodecyl sulfate (SDS), which is usually used as foaming additive.

This is particularly unexpected in view of that a suspension of uncooked particulate starch was used for foam generation. In addition, the use of amphiphilic polymer allows foam generation free or basically free of surfactants, especially free of oil-based surfactants such as SDS.

It is a further important advantage of the method to allow for a foam coating of a high solid content of starch between the plies of a multiply paperboard which provides for improved adhesion and better interply strength of paperboard. This is especially advantageous compared to liquid coating of solutions of low solid content which requires application of high amounts of liquid to the web which in turn requires subsequent drying and respective energy consumption. Reduced drying costs further enable cost savings, e.g. through improved drainage. The method allows for a dosing of starch particles either between plies of multiply paperboard or as surface treatment onto a wet paper/paperboard web. The method applying particles of starch to a paper or paperboard web using foam coating techniques achieves several advantages. The method is usable for wet on wet dosing. The method enables application of higher solid contents, which also reduces drying costs. The method avoids problems of contamination and deposits in the paperboard environment. And the method enables the manufacture of multiply paperboard providing better interply strength.

As used herein, "paper" and "paperboard" refers to a paper based substrate of an amalgamation of fibers that can include, at least in part, vegetable, wood, and/or synthetic fibers. The paper or paper board web preferably comprises cellulosic fibres. The web preferably comprises cellulose fibers from hardwood and/or softwood. The paper or paper board web may have a grammage of e.g. in a range of 15-150 gsm, or 20-150 gsm. The grammage of the final paper or paperboard may be in a range of 30-800 gsm.

The term starch as used herein refers to starch derived of plant material that is usually used in the papermaking industry and which may be rise, barley, wheat, potato, maize, or tapioca starch. The term starch particles refers to starch that has not been cooked for full dissolution, i.e. to soluble and polymeric form, but is in its native, pre-gelatinized or partly gelatinized granular form. Such "uncooked" or partly uncooked starch contains particulate starch material that can be identified e.g. with a microscope. The term uncooked starch means that the starch has not been cooked, so that the main fraction of starch particles is visible in an optical light microscope. Even starch in its unmodified and uncooked form tends to swell, especially if stored at higher pH or elevated temperature. That means, also uncooked starch may be swollen to some extent. Therefore, the term starch particles as used herein also includes gelled starch or swollen starch. All forms of swelling and native particles can be identified with an optical microscope. Starch particle size can be determined e.g. with laser light scattering or low angle laser light scattering. One example is a Mastersizer 2000 particle size analyser (Malvern, UK), which measures the percentage of the total starch volume for a given diameter size interval. Other methods to determine the average particle size are e.g. optical image analysis. The use of starch in the method as discussed herein is performed on such starch particulate material.

The term "amphiphilic polymer" refers to a so called surface active polymer which has both hydrophilic and hydrophobic (or lipophilic) groups. The amphiphilic polymer or surface active polymer may be a so called hydrophobic surface active polymer. According to one embodiment, the amphiphilic polymer has molecular weight (Mw) of more than 20 000 g/mol, preferably more than 40 000 g/mol or more than 50 000 g/mol. This contributes to increasing the solid content of the formed foam. The amphiphilic polymer may further have a cloud point in a range of 40-80° C., which further improves the stability of the formed foam. According to one embodiment, the amphiphilic polymer is selected from the group of ethyl hydroxyethyl cellulose (EHEC), hydrophobic modified (HM) ethylhydroxyethyl cellulose (HM-EHEC), hydroxyethyl cellulose (HEC), hydrophobic modified hydroxyethyl cellulose (HM-HEC), hydroxyproylated cellulose (HPC), hydrophobic modified carboxymethyl cellulose (HM-CMC), hydrophobic modified starch (HM-starch), hydroxypropylated starch, or a combination or mixture thereof. The amphiphilic polymer may also be selected from the group of octenyl succinic anhydride (OSA) starch, dodecyl succinic anhydride (DDSA) starch, carboxymethyl cellulose (CMC) having hydrophobic properties, or a combination or mixture thereof. These amphiphilic polymers have been shown to be particularly advantageous and are further biodegradable. According to a further embodiment, the amphiphilic polymer may selected from the group of hydrophobically modified polyvinyl alcohol (PVOH), such as ethylene modified PVOH, or PVOH modified with silanol, cationic or carboxylic functional groups. According to a further embodiment, the amphiphilic polymer may be a polyvinyl alcohol containing ≥2% acetate groups, containing ≥10% acetate groups, preferably containing ≥15% acetate groups. The amphiphilic polymer may also be a charged amphiphilic polymer. The charge may facilitate the retention. The amphiphilic polymer may also be a mixture of these different amphiphilic polymers. The term "amphiphilic polymer" further refers to polymers that tend to self-associate such as synthetic block-copolymers and proteins. The amphiphilic polymer further may be a polyelectrolyte that is physically grafted, for example through sorption or precipitation or crosslinking or ion-exchange, with e.g. metal salts or oppositely charged polymers.

In embodiments, the aqueous suspension comprises the amphiphilic polymer in an amount in a range from ≥0.5 wt % to ≤30 wt %, preferably in a range from ≥1 wt % to ≤10 wt %, based on the dry solid content of the suspension. The aqueous suspension may comprise the amphiphilic polymer in an amount in a range from ≥1 wt % to ≤5 wt %, based on the dry solid content of the suspension. These amounts of amphiphilic polymer such as ethyl hydroxyethyl cellulose have been shown to provide for advantageously high solids contents of a foamed suspension.

Sodium dodecyl sulphate (SDS) is typically used as a foaming aid. Advantageously, using the aqueous suspension a foam can be created in the absence of tenside such as SDS and the use of SDS can be avoided or significantly reduced. Particularly, a high solids contents of the foamed suspension was achieved without addition of SDS to the suspension. The aqueous suspension is preferably free or substantially free, meaning comprising less than 1 wt % based on the dry solid content of the suspension, from oil-based surfactants such as SDS, dodecylbenzenesulfonic acid sodium salt (SDBS) or the like. This advantageously can improve adhesion between plies since oil-based surfactants can cause weak bonding layer and thus impair the adhesion. It has been shown that when the composition comprises surface active polymers but substantially no oil-based surfactant a foam at higher solid contents could be formed. Without being bound to a specific theory, it is believed that the surfactant-free suspension enables higher interply strength.

The amphiphilic polymer can be used in combination with other agents useful to create and/or stabilize a foam. The aqueous suspension may comprise co-additives, for example additives selected from gelled and/or dissolved starch, nanocellulose, fillers, and nanopigments. As used herein, "filler" refers to inorganic, particulate materials used for papermaking as usually referred to in the paper industry. The term nanopigments refers to nanoscale powders, thus having at least one dimension with an average particle size in a range of 1-100 nm. The pigment may be selected from clay and/or talc. The aqueous suspension may comprise co-additives in amounts in a range of ≥0.01 wt % to ≤70 wt %, or in a range of ≥0.01 wt % to ≤50 wt %, or in a range of ≥0.01 wt % to ≤30 wt %, or in a range of ≥0.01 wt % to ≤10 wt %, based on the dry solid content of the suspension.

The aqueous suspension may comprise nanocellulose, i.e. a nanofibrillated or microfibrillated cellulose. In a preferred embodiment, the aqueous suspension comprises microfibrillated cellulose (MFC). The microfibrillated cellulose (MFC) is also known as nanocellulose. The term refers to a material typically made from wood cellulose fibers, both from hardwood or softwood fibers. It can also be made from microbial sources, agricultural fibers such as wheat straw pulp, bamboo or other non-wood fiber sources. In microfibrillated cellulose the individual microfibrils have been partly or totally detached from each other. A microfibrillated cellulose fibril is normally very thin, such as about 20 nm, and the length is often between 100 nm to 10 μm. The microfibrils may also be longer, for example between 10-200 μm, but lengths even 2000 µm can be found due to wide length distribution. Fibers that has been fibrillated and which have microfibrils on the surface and microfibrils that are separated and located in a water phase of a slurry are included in the definition of MFC.

Furthermore, cellulose whiskers may also be included in the definition MFC. The fibrils may also be polymer coated fibrils, i.e. a modified fibril either chemically or physically. Microfibrillated cellulose (MFC) advantageously is useful for stabilization of the foam and/or avoiding penetration of the applied starch suspension into the paper or paperboard web. Microfibrillated cellulose (MFC) can be applied in amounts in a range of ≥0.01 wt % to ≤70 wt %, or in a range of ≥0.01 wt % to ≤50 wt %, or in a range of ≥0.01 wt % to ≤30 wt %, or in a range of ≥0.01 wt % to ≤10 wt %, based on the dry solid content of the suspension.

The aqueous suspension may comprise further functional chemicals, such as colorants, pigments, cross-linkers, humectants etc.

If not specifically denoted otherwise, given % are weight % (wt %), and are calculated either on the basis of a dry weight of 100 wt % or of a total weight of 100 wt % of the respective object such as a suspension. The total amount of all respective components does not exceed 100 wt %. It is further understood that the remainder of the aqueous suspension is water so that the total weight of the aqueous suspension becomes 100 wt %.

The aqueous suspension comprises starch in form of starch particles. The suspension may comprise starch granules. In embodiments, the aqueous suspension comprises the starch particles in an amount in a range from ≥30 wt % to ≤99 wt % or from ≥50 wt % to ≤99 wt %, preferably from ≥70 wt % to ≤99 wt % or from ≥90 wt % to ≤99 wt %, based on the dry solid content of the suspension. The aqueous suspension before foaming comprises a high amount of starch particles. In embodiments, the suspension comprises the amphiphilic polymer in an amount in a range from ≥1 wt % to ≤10 wt % and starch particles in an amount in a range from ≥30 wt % to ≤99 wt %, or from ≥50 wt % to ≤99 wt %, or from ≥70 wt % to ≤99 wt % or from ≥90 wt % to ≤99 wt %, based on the dry solid content of the suspension.

Native starch particles may be further granulated to achieve a certain particle size prior to use, but the starch remains in its granular form. In embodiments, the starch particles have a median particle diameter in a range from ≥0.5 µm to ≤200 µm. Surprisingly it has been found that such big particles can be used in foam application. The median particle diameter may be at least 1 µm or 2 µm. Preferably, the median particle diameter is in a range from ≥1 µm to ≤200 µm, more preferably in a range from ≥2 µm to ≤200 µm. The starch particles may be processed into smaller particle size starches by e.g. fractionation or mechanical or chemical modification. The average particle size of starch depends on the source, but can be typically in a range from ≥10 µm to ≤30 µm. As used herein, "median particle size" ($D_{50}$) refers to the particle size at which 50 percent (by volume) of the starch particles are above and 50 percent are less than that particle size. The particle size as given herein refers to the particle size determined at a pH of 5-9 in a dilute aqueous suspension, at an electrolyte concentration of 0.001-0.01 M NaCl, and at a temperature of 20-25° C., using a Mastersizer 2000 particle size analyser (Malvern, UK).

The starch can be native or modified. In one preferred embodiment, the starch is native starch. The starch particles may also be nanostarch, such as nanostarch available from Ecosynthetix. The term nano starch refers to starch granules having a size in nanometer range. Also mixtures of nanoparticles of starch and native starch are usable. Advantageously, the starch particles may vary widely in particle size and/or have a wide size distribution.

The aqueous suspension comprising starch particles and amphiphilic polymer is in a following method step used to create a foam. The term foam refers to a two phase systems of gaseous bubbles which are separated by liquid lamella. Creating a foam can be accomplished by any conventional means, such as mechanically, by agitation, or chemically, by adding foam forming chemicals. A foam can be obtained by agitating the aqueous suspension in the presence of air, for example with a stream of air or with the help of a stirrer. High-pressure air may be used for creating the foam. For generating the foam, a usual foam generator can be used.

It has been shown that surprisingly high solids contents of stable foams comprising starch granules are possible to achieve with the method. In embodiments, the solid content of the foamed aqueous suspension is ≥5 wt %, preferably ≥10 wt %, more preferably ≥15 wt %, based on a total weight of 100 wt % of the foamed suspension. The solid content of the foamed aqueous suspension may be in a range from ≥5 wt % to ≤50 wt %, in a range from ≥5 wt % to ≤40 wt %, or in a range from ≥5 wt % to ≤20 wt %, based on a total weight of 100 wt % of the foamed suspension. The solid contents of the foam as given relates to solids contents of starch. The solid content can be determined using methods known in the art such as by drying and weighting, such as using an IR dryer.

In embodiments, the density of the foamed aqueous suspension is ≥10 g/100 ml, preferably above 14 g/100 ml.

In a following method step the foam is used for coating of a paper or paperboard web. A benefit of using a foam is that foam coated particles show improved tendency to stay on the surface of the web. This enables less infiltration of the starch particles into the web. It provides an advantage of foam, more specifically of the air bubbles in the foam, that the created foam prevents the coated starch penetration into the structure of the paper or board being manufactured. This a particularly valuable advantage for surface size starch.

The foam may be applied using coating techniques generally used in papermaking processes such cast coating or blade coating. It is however preferred to apply the foam to the substrate by use of a non-impact coating technology. The term "non-impact" coating refers to coating procedures avoiding contact between mechanical elements of the applicator head and the paper or minimizing contact pressure during application. This has considerable advantages concerning runnability, e. g. avoiding possible web breaks, and surface quality, e.g. avoiding defects like streaks. The term "non-impact" coating is not meant to exclude a gentle levelling with rod, blade or air jet afterwards. In embodiments, the foam is applied to the paper or paperboard web by a non-impact coating technology selected from spray coating, curtain coating or foam coating. Curtain and spray coating offer advantages over conventional blade or roll coating by eliminating streaks and reducing the risk of web breaks. A preferred application method is spray coating. This application method efficiently avoids destruction of a previous formed layer or web. Most preferred is foam coating. Foam application methods enable the use of high dry contents. Foam coating offers the advantage to apply a thin coating on the web surface, for example with a coat weight of than 2 gsm. The foam coating may be applied to the paper or paperboard web using a foam coating applicator or coater.

The method allows for a dosing of starch particles either between plies of multiply paperboard or as surface treatment onto a wet paper/paperboard web. The application of starch particles by the method may be carried out in the wet-end and/or the dry-end of a paper or paperboard manufacturing process. The method is usable to surface size a paperboard web with starch particles. The method thus may relate to an improved process of surface sizing paper and paperboard. The method further is particularly usable for dosing starch between plies in the production of a multiply paperboard. The method thus may further relate to an improved process of manufacturing a multiply paperboard.

In embodiments, the foam is applied to a paper or paperboard web having a solid content of less than 50 wt %, preferably less than 70 wt %, based on a total weight of 100 wt % of the paper or paperboard web.

The method is usable to surface size a paperboard web with starch particles. In embodiments, the method is a method of surface sizing a paper or paperboard web. In surface sizing applications, the foam may be applied to a wet-web, such as having a solid content of less than 50 wt %, preferably less than 85 wt % or less than 90 wt %, before the drying section.

In a preferred embodiments, the method is a method of dosing starch between plies in the production of a multiply paperboard. In these embodiments, the starch particles are applied to the wet web before this is adhered to another web. The method of the invention enables an improved interply strength. In addition to improving the interply adhesion also the converting of board is improved due to better coverage and more even spreading of the starch granules. Another possibility that opens when using the invention to dose starch between plies is that it can be applied to the web not only when this is running horizontally, but also when the web is running vertically in the paperboard production. This is oftentimes more practically during the manufacturing process.

The applied coat weight may be in a range from $\geq 0.1$ g/m$^2$ to $\leq 30$ g/m$^2$, preferably in a range from $\geq 0.5$ g/m$^2$ to $\leq 20$ g/m$^2$, more preferably in a range from $\geq 1$ g/m$^2$ to $\leq 10$ g/m$^2$. The coat weight or grammage refers to the weight expressed as grams per square meter, gsm or g/m2.

As used herein, gsm and g/m$^2$ may be used interchangeable. The method of the invention advantageously enables the application of a thin layer but still achieve good coverage. The respective dosing can be made with a foam coating unit, a curtain or spray coating unit.

The invention further relates to a paper or paperboard product obtained by the method of the invention. The paper or paperboard product comprises at least one starch layer applied via foam coating of a foam obtained from an aqueous suspension comprising starch particles and at least 1 wt %, based on the dry solid content of the suspension, of an amphiphilic polymer. The paper or paperboard product may comprise at least one starch layer applied on at least one side and on at least one ply.

In embodiments, the paper or paper board product comprises at least one starch layer having a coat weight in a range from $\geq 0.1$ g/m$^2$ to $\leq 30$ g/m$^2$, preferably in a range from $\geq 0.5$ g/m$^2$ to $\leq 20$ g/m$^2$, more preferably in a range from $\geq 1$ g/m$^2$ to $\leq 10$ g/m$^2$. The coat weight as given refers to the dry weight.

The starch is applied in form of particles to the paper or paper board web. After application of the starch during the following manufacture steps the paper or paper board web may be heated and the starch may be cooked and gelatinzed on the paper or paper board web. The manufactured paper or paper board product thus comprises at least one starch layer, wherein the starch may be uncooked starch and/or cooked or gelatinzed starch. The manufactured paper or paper board product preferably comprises layers of cooked or gelatinzed starch.

The starch layer may be applied as a sizing layer or as a layer in between plies. In embodiments, the paperboard product is a multiply paperboard. The paper or paper board product may comprise at least one ply, preferably several plies, for example a top and a back ply and at least one middle ply. The paper or paper board product may comprise several interply starch layers, for example two or three interply starch layers. The multiply paperboard advantageously may provide improved adhesion of the plies.

In further embodiments, the paperboard product is a surface-sized paper or paperboard. The paper or paper board product may comprise at least one surface sizing layer. The sizing layer applied by the method via foam coating using starch particles and amphiphilic polymer advantageously can provide a very even starch sizing layer comprising a minimal roughness.

The paperboard product may be a multilayer paperboard, comprising at least two layers, a back ply and a top ply, and preferably at least one middle ply or several middle plies. The paperboard product may have a basis weight in a range of 30-800 gsm. The paper or paper board produced can be any type of paper or paper board, such as a liquid packaging board, folding box board, solid bleached board, solid unbleached board or container board. One possible product is corrugated board, where the web is either the liner or the corrugated medium and the aqueous suspension comprising the starch particles and the amphiphilic polymer is a glue applied to attach the corrugated medium to the liner.

Further features of the present invention will become apparent from the following examples.

EXPERIMENTAL MATERIALS AND METHODS

The materials used for generating the aqueous coating suspensions were uncooked starch particles (barley, Altia Plc, Finland), hydrophobically modified hydroxyethyl cellulose (EHEC, Bermocoll EHM200, AkzoNobel Chemicals AG, Sweden), and Sodium dodecyl sulfate (SDS, Merck KGaA, Germany). The particle size distribution (by volume) of the uncooked starch particles used is shown in Table 1. The particle size was measured at pH around 7 and at a temperature of 23° C. using a Mastersizer 2000 particle size analyser (Malvern, UK).

TABLE 1

|  | D10 | D50 | D90 |
| --- | --- | --- | --- |
| Wet sample (30 min-1 h 30 min) | 10.9 | 17.4 | 26.4 |
| Stdev | 0.1 | 0.0 | 0.1 |

Cupforma classic 210 gsm was used as substrate. The starch was mixed as received without further treatment into cold water. The foam was generated with A Rollmix BGR 13 (Rollmac, Italy). Coating of the substrate was conducted with a bench coater (rod).

pH and viscosity of the aqueous suspensions were measured before generating the foam. Viscosity of the foam was measured with a Brookfield digital viscometer (Model DVII+, Brookfield Engineering Laboratories, Inc.) using spindle #6 and speeds of 10 and 50 rpm at the temperatures given in the tables below. For the measurement of the viscosity of the aqueous suspensions spindle #1 and 50 rpm was used, except sample 6, where 10 rpm were used. Solid content was measured with an IR dryer. Sample amount was about 1 g. The foam density was determined by dividing the measured weight of the foam with the measured volume.

Reference Examples 1 and 2

Reference examples 1 and 2 were performed in which the foaming capacity of aqueous suspensions without addition of a foam generating agent was evaluated in a laboratory trial. The components and properties of the suspensions of reference examples 1 and 2 are summarised in table 2:

TABLE 2

| Example | 1 | 2 |
|---|---|---|
| Starch, barley, wt % | 100 | 100 |
| EHEC | — | — |
| SDS | — | — |
| Foam generation | no | no |
| Temperature, ° C. | 21.1 | 20.8 |
| Solids, wt % (in the suspension before foaming) | 7 | 10 |
| Coat weight | no | no |
| Foam density, g/100 ml | | |
| Brookfield 10 rpm | | |
| Brookfield 50 rpm | | |
| pH (liquid) | 6.61 | 6.67 |
| Brookfield 50 rpm, liquid | 9.2 | 9.8 |
| Solids of the foam | | |

The suspensions of reference examples 1 and 2 did not foam. This confirms that without additives, no foaming is observed.

Examples 3 to 6

A test series was performed in which the foaming capacity of suspensions comprising uncooked starch particles and amphiphilic polymer in accordance with the invention was evaluated. Experiments were performed using EHEC as foaming agent. The components and properties of the aqueous suspensions of examples 3 to 6 are summarised in table 3:

TABLE 3

| Example | 3 | 4 | 5 | 6 |
|---|---|---|---|---|
| Starch, barley, wt % | 100 | 100 | 100 | 100 |
| EHEC, wt % | 1 | 5 | 5 | 5 |
| SDS | — | — | — | — |
| Foam generation | yes | yes | yes | yes |
| Temperature, ° C. | 21 | 23 | 20.5 | 21 |
| Solids, wt % | 7 | 7 | 12 | 18 |
| Coat weight | 3.5 | 3.8 | 4.2 | 4.6 |
| Foam density, g/100 ml | 14.57 | 14.98 | 23 | 47.56 |
| Brookfield 10 rpm | 2100 | 1400 | 2200 | 4600 |
| Brookfield 50 rpm | 760 | 440 | 920 | 2360 |
| pH (liquid) | 5.7 | 6.2 | 6.0 | 5.78 |
| Brookfield 50 rpm, liquid | 11.6 | 22 | 64.6 | 540 |
| Solids of the foam | | | 11.58 | 17.15 |

In addition to pH and viscosity, the solids contents of the foam was measured for examples 5 and 6 providing of aqueous starch solutions with 12 and 18 wt-% solids content, respectively. The solid content was determined with an IR dryer. The sample amount was about 1 g. As can be seen in table 2, the content of starch in the foams of examples 5 and 6 was very high. The EHEC based foams were stable and did not break completely during coating. Further, the breakage of the EHEC foam in coating was more controlled.

The shows that not only foam coating using uncooked starch is possible to use, but that a tenside-free generation of foam can be achieved, yielding a much higher starch content than expected. This is a significant improvement over the prior art technique using SDS as a tenside.

Reference Examples 11 to 14

A further test series was performed in which the foaming behavior of aqueous starch solutions with SDS as foaming agent was evaluated. The components and properties of the aqueous suspensions of reference examples 11 to 14 are summarised in table 4:

TABLE 4

| Example | 11 | 12 | 13 | 14 |
|---|---|---|---|---|
| Starch, barley, wt % | 100 | 100 | 100 | 100 |
| SDS, wt % | 1 | 5 | 5 | 5 |
| Foam generation | poor | poor | poor | poor |
| Temperature, ° C. | 21.6 | 22.5 | 20.6 | 21.4 |
| Solids, wt % | 7 | 7 | 12 | 18 |
| Coat weight, gsm | 2.4 | 3.3 | 2.4 | 2.3 |
| Foam density, g/100 ml | 26.98 | 13.2 | 24.43 | 24.95 |
| Brookfield 10 rpm | 840 | 1400 | 700 | 1100 |
| Brookfield 50 rpm | 480 | 560 | 460 | 400 |
| pH (liquid) | 6.75 | 7.03 | 6.92 | 6.95 |
| Brookfield 50 rpm, liquid | 9 | 9.4 | 11 | 11.8 |
| Solids of the foam | 6.05 | 6.52 | 8.12 | 9.9 |

The foam of reference example 11 using 1 wt % SDS broke almost immediately. However, the foam of reference example 12 using 5 wt % SDS was very stable and did not break when coated with a rod. Increasing the solids content to 12 and 18 wt % in the liquid suspension however did not result in higher solid content of foam when using SDS foams, as can be seen in reference samples 13 and 14 where the solid content of the foams remained low. Also, the water separated quickly. This shows that SDS as foaming agent only provides for poor foam generation with less starch content in the foam.

Reference Examples 15 to 18

A further test series was performed in which the foaming behaviour of aqueous starch solutions without foaming agent was evaluated. The components and properties of the aqueous suspensions of reference examples 15 to 18 are summarised in table 5:

TABLE 5

| Example | 15 | 16 | 17 | 18 |
|---|---|---|---|---|
| Starch, barley, wt % | 100 | 100 | 100 | 100 |
| Foam generation | no | no | no | no |
| Temperature | 21.1 | 20.8 | 20.5 | 21.8 |
| Solids, wt % | 7 | 10 | 12 | 18 |
| pH (liquid) | 6.61 | 6.67 | 6.67 | 6.77 |
| Brookfield 50 rpm, liquid | 9.2 | 9.8 | 10.6 | 12.4 |

This reference examples illustrate the increasing viscosity with increasing solid content.

The invention claimed is:
1. A method for applying starch to a paper or paperboard web, the method comprising the steps of:
providing an aqueous suspension comprising starch particles and at least 1 wt %, based on a dry solid content of the aqueous suspension, of an amphiphilic polymer, wherein the starch particles are uncooked or partly uncooked starch, wherein the starch particles are not nanofibrillated or microfibrillated cellulose, and wherein the suspension contains less than 1% of a surfactant based on the dry solid content of the suspension, creating a foam from the aqueous suspension, wherein a solid content of the foamed aqueous suspension is in a range of ≥15 wt % to ≥50 wt %, based on a total weight of 100 wt % of the foamed suspension; and applying the foam to the paper or paperboard web.

2. The method according to claim 1, wherein the amphiphilic polymer is selected from a group consisting of: ethyl hydroxyethyl cellulose, hydrophobic modified ethylhydroxyethyl cellulose, hydroxyethyl cellulose, hydrophobic modified hydroxyethyl cellulose, hydroxyproylated cellulose, hydrophobic modified carboxymethyl cellulose, hydrophobic modified starch, hydroxypropylated starch, and combinations or mixtures thereof.

3. The method according to claim 1, wherein the aqueous suspension comprises the amphiphilic polymer in an amount in a range from ≥1 wt % to ≤10 wt %, based on the dry solid content of the suspension.

4. The method according to claim 1, wherein the aqueous suspension comprises the starch particles in an amount in a range from ≥30 wt % to ≤99 wt %, based on the dry solid content of the suspension.

5. The method according to claim 1, wherein the starch particles have a median particle diameter in a range from ≥0.5 μm to ≤200 μm.

6. The method according to claim 1, wherein the aqueous suspension further comprises microfibrillated cellulose.

7. The method according to claim 1, wherein the foam is applied to the paper or paperboard web by a non-impact coating technology selected from a spray coating, a curtain coating, or a foam coating.

8. The method according to claim 1, wherein the foam is applied to a paper or paperboard web having a solid content of less than 50 wt %, based on a total weight of 100 wt % of the paper or paperboard web.

9. The method according to claim 1, wherein the method is a method of surface sizing a paper or paperboard web.

10. The method according to claim 1, wherein the method is a method of dosing starch between plies in a production of a multiply paperboard.

11. The method according to claim 1, wherein the starch comprises rice, barley, wheat, potato, maize, or tapioca.

12. The method according to claim 1, wherein the aqueous suspension comprises the starch particles in an amount in a range from ≥70 wt % to ≤99 wt %, based on the dry solid content of the suspension.

13. The method according to claim 1 wherein the foam has a density ≥10 g/100 ml.

14. The method according to claim 1 wherein the foam has a density ≥14 g/100 ml.

15. A method for applying starch to a paper or paperboard web, the method comprising the steps of:

providing an aqueous suspension comprising starch particles and at least 1 wt %, based on a dry solid content of the aqueous suspension, of an amphiphilic polymer, creating a foam from the aqueous suspension, and applying the foam to the paper or paperboard web, wherein the foam is applied to a paper or paperboard web having a solid content of less than 50 wt %, based on a total weight of 100 wt % of the paper or paperboard web.

* * * * *